Figure 1:
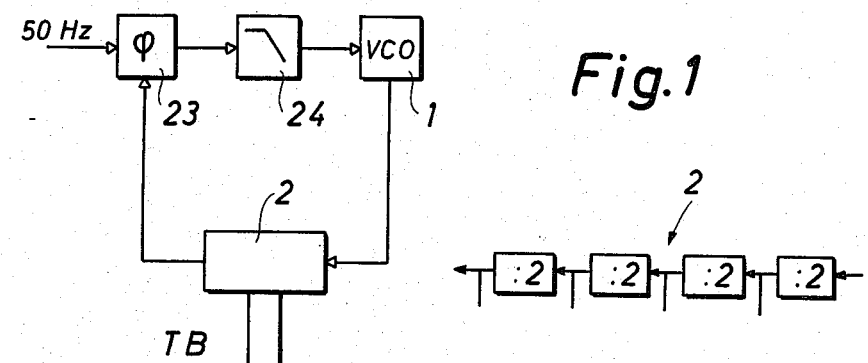

United States Patent [19]

Jensen et al.

[11] 4,233,551

[45] Nov. 11, 1980

[54] CONTROL CIRCUIT FOR AN A.C. MOTOR

[75] Inventors: Axel Jensen, Bjerringbro; Niels Molgaard, Silkeborg, both of Denmark

[73] Assignee: Grundfos A/S, Bjerringbro, Denmark

[21] Appl. No.: 911,511

[22] Filed: Jun. 1, 1978

[30] Foreign Application Priority Data

Jun. 3, 1977 [DK] Denmark ............................ 2465/77

[51] Int. Cl.³ ............................................. H02P 5/28
[52] U.S. Cl. .................................... 318/809; 318/812
[58] Field of Search ........................ 318/767, 809, 812

[56] References Cited

U.S. PATENT DOCUMENTS

| 3,665,273 | 5/1972 | Enslin ................................... 318/809 |
| 3,703,672 | 11/1972 | Bird et al. ............................ 318/809 |
| 4,070,605 | 1/1978 | Hoeppner ........................ 318/809 X |

*Primary Examiner*—Gene Z. Rubinson
*Attorney, Agent, or Firm*—Haseltine, Lake & Waters

[57] ABSTRACT

The present invention relates to a control circuit for an A.C. motor with two or several sets of windings. The switch-off phase of the first set of windings is symmetrical with the turn-on phase of the second set of windings, and it is illustrated how to modify the supplied current by simultaneous, symmetrical modification of said phases. As a result a symmetrical field distribution over each pole is obtained even if the turn-on and switch-off phases of the currents supplied to the windings are regulated.

4 Claims, 3 Drawing Figures

CONTROL CIRCUIT FOR AN A.C. MOTOR

The invention relates to a control circuit for an A.C. motor with two or several sets of windings, and which comprises a device controlling the power supply to the windings.

German divulgated specification No. 1,939,223 discloses a manner of controlling the current and thereby the magnetic fields by means of silicon controlled rectifiers. However, these silicon controlled rectifiers do not provide a symmetrical field distribution in time and place over the individual poles.

The object of the invention is to provide a control circuit, which arranges the switch-off phase of one winding symmetrical with the turn-on phase of the second winding, and which renders it possible to modify the supplied current by simultaneous, symmetrical modification of said phases.

The control circuit according to the invention is characterized in that a dividing circuit in the form of a counter is connected to the mains through a voltage controlled oscillator and transmits a bit pattern corresponding to the instantaneous phase of the voltage of the mains, as the bit pattern corresponding to the maximum counting corresponds to 90°, and that the bit pattern is transmitted to binary comparator units through a data bus for comparison with both a preselected phase in the form of a bit pattern and the complement thereof, each comparator unit at bit pattern identity transmitting a signal for a trigger circuit for the control of a means, said means controlling the power supply to the individual windings, whereby one of the means is adapted to switch off the power supply to a winding before the zero cross of the voltage of the mains by means of a switch-off circuit.

The data bus comprises preferably four bits. The resolution capability is therefore $90°/2^4 = 5.63°$.

Furthermore, according to the invention, the circuit may comprise an analogue-to-digital converter for adjusting the data bus, whereby the data bus is adjustable by means of a variable voltage.

Finally, the switch off-circuit may comprise a transformer adapted to charge a capacitor in such manner that the charge thereof is able to switch off a silicon controlled rectifier at a desired phase before the zero cross of the voltage of the mains.

Figure 2:
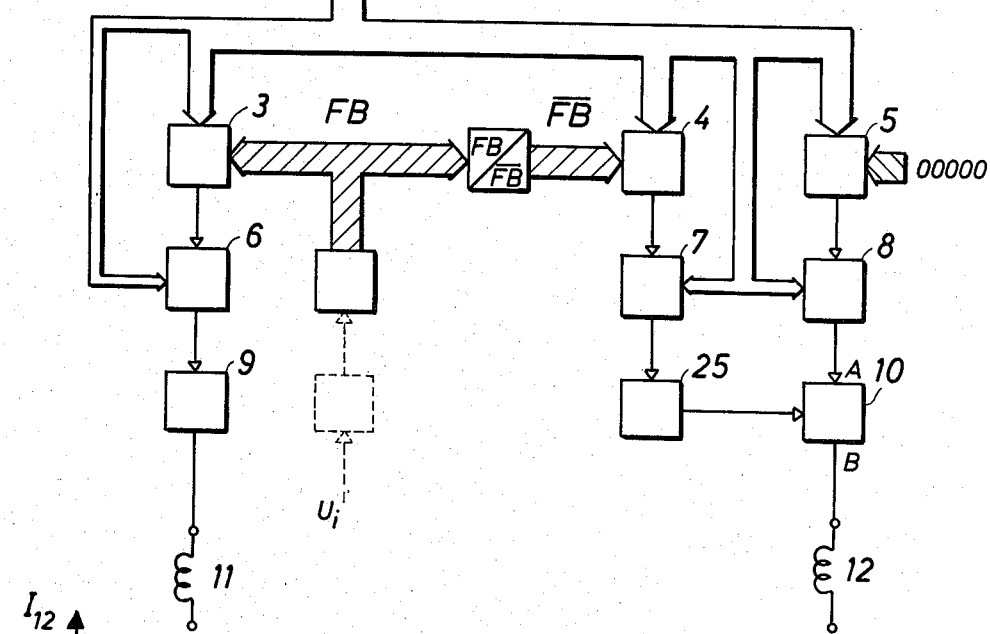
Figure 2:
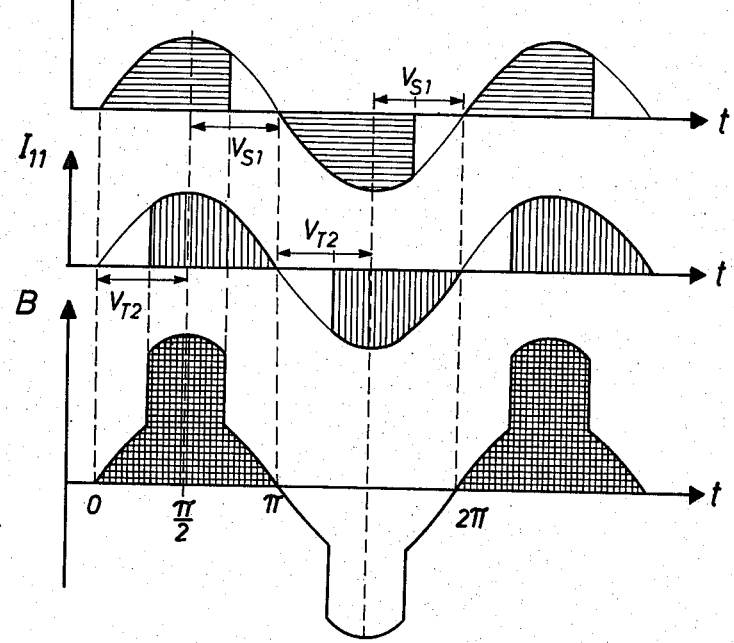
Figure 3:
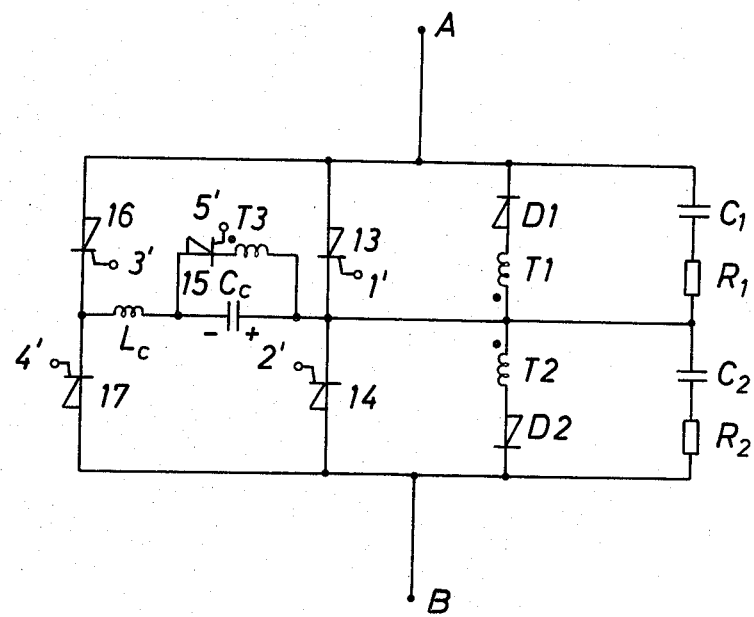

The invention will be described below with reference to the accompanying drawings, in which FIG. 1 illustrates a circuit according to the invention for the control of the virtual values of the currents to the windings of an A.C. motor, FIG. 2 illustrates the currents and the resulting magnetic field versus the time, and FIG. 3 illustrates a control means in the control circuit and comprising a switch-off circuit.

The A.C. motor, e.g. a three-phase motor, comprises two identical, but electrically separated windings 11 and 12 per pole. The sum of the fields from said two windings 11, 12 corresponds to the field B observed by the motor. A symmetrical field distribution over each pole is aimed at, even if the phase of the currents supplied to the windings 11, 12 is regulated.

The magnetic field B is a superposition of the fields produced by $I_{11}$ and 12, respectively. The windings are identically placed. The superposition of the fields from 11 and 12 is therefore proportional to the sum $I_{11}$ and $I_{12}$, cf. page 3, line 25 and FIG. 2 which clearly illustrate these conditions.

In the circuit, according to the invention, a special switch-off circuit is provided which permits the switch-off of a silicon controlled rectifier before zero crossover by passing current through the silicon controlled rectifier in opposite direction. As a result, a symmetrical waveform could be supplied to the windings and the RMS value could be changed without making the waveform asymmetrical.

A control circuit connected to the mains of 50 Hz comprises a phase detector 23, a low-pass filter 24, and a pulse generator 1 transmitting pulses of a frequency controlled by the voltage applied. The pulse generator 1 is connected to a binary counter 2 transmitting a pulse each time it receives $2^N$ from the pulse generator 1. The output of the counter—which serves as a frequency divider—is retransmitted to the phase detector 23 to form a feedback loop. In the phase detector 23 a pulse corresponding to a predetermined phase of the signal of the mains is compared to the pulse from the counter 2, whereby it is possible to adjust when the difference in phase between the two pulses is too large or too small. The phase detector 23 transmits a DC-signal superimposed by an AC-signal and corresponding to the phase difference, and the low-pass filter 24 filters off the AC-signal in such manner that only the DC-signal is transmitted to the voltage controlled oscillator 1, i.e. the pulse generator, for the control of the frequency thereof. The feedback loop implies that the voltage controlled oscillator 1 seeks to balance, i.e the frequency adjusts itself to $2^N \times 50$ Hz. The output of the counter circuit 2—comprising N-steps—provides a bit pattern substantially corresponding to the instantaneous phase of the voltage. Through a bus TB the bit pattern is transmitted to three comparator units 3, 4, and 5. In the comparator unit 5 the status or bit pattern of TB is compared with the zero-signal for turning on the power supply to the winding 12. In the comparator unit 3 the status or bit pattern of TB is compared with the status or bit pattern of a bus FB for turning on the power supply to the winding 11 at a desired phase. In the comparator unit 4 the status or bit pattern of TB is compared with the complement of FB for interruption of the power supply to the winding 12 at a phase symmetrical with the above first phase in relation to the summit of the voltage of the means. It should be noted that the maximum counting of the bit pattern corresponds exactly to 90°. In order to start supply of current to the winding 12 at zero cross, the comparator unit 5 activates a trigger unit 8 at the zero cross, said trigger unit 8 may, however, also be activated at other moments. Correspondingly, the comparator unit 3 activates the trigger unit 6 at a later phase. At the above first symmetrical phase the comparator unit 4 interrupts the power supply to the winding 12 through a trigger unit 7 and a switch-off circuit 25, cf. FIG. 2. A control means 9 or 10 is coupled between each trigger unit and the associated winding. 9 is a conventional triac circuit. 10 is illustrated in FIG. 3 together with the switch-off circuit 25.

The control means 10, the control terminals 1' to 5' of which are connected to the bus TB through logical networks, comprises two oppositely coupled silicon controlled rectifiers 13 and 14. These silicon controlled rectifiers are controlled through logical networks of the two most important bits of the bus TB, said bits always alternating at zero cross of the voltage of the mains, i.e.

the bus "counts" to 16 during an entire period of the mains.

The control means 10 furthermore comprises a transformer including the primary windings T1, T2 and the secondary winding T3. The latter is coupled in the illustrated direction of winding and serves to charge a capacitor $C_C$ in the switch-off circuit 25, whereby the capacitor at trigging of the silicon controlled rectifier 15 is adapted to switch off either the S.C.R. 13 or the S.C.R. 14. The S.C.R. 15 shunting $C_C$ together with T3 opens each time the S.C.R. 13 or 14 opens, whereby the charge current for $C_C$ may pass. The S.C.R. 15 recloses when the charge current is lower than the holding current for the S.C.R.

Once in each half-period of the voltage of the mains the comparator units 4 and 5 transmit a pulse. The two silicon controlled rectifiers 13 and 14 controlled thereby may only open and close once during each half-period. The logical networks in connection with the trigger circuits 7 and 8 then select through the configuration of the bus TB and logical networks, the S.C.R. to be opened and closed respectively at the moment in question.

The control means 10 operates in the following manner:

1°. Terminal A is initially positive. The S.C.R. 13 with the gate electrode 1' opens, i.e. TB has the value (0.0.0.0). The current pass is then A-13-T2-D2-B. Subsequently, the S.C.R. 15 opens and $C_C$ is charged due to the voltage in the secondary winding T3.

2°. When $C_C$ is charged, the charge current decreases to zero. The S.C.R. 15 closes when the charge current is lower than the holding current for the S.C.R. 15, and $C_C$ maintains its charge.

3°. The S.C.R. 16 opens by means of the bits of minor importance and transmits the negative voltage of $C_C$ to the anode of the S.C.R. 13.

4°. The S.C.R. 13 ceases being conductive as the current is forced backwards through 13. Now the S.C.R. 16 takes over the function of 13 until $C_C$ has been charged to opposite polarity and the charge current has dropped below the holding current for the S.C.R. 16.

5°. This was the sequence of half a voltage of the mains period, and the terminal B is positive. The S.C.R. 14 opens by means of the bits of minor importance. The current pass is now B-14-T1-D1-A. At the same time S.C.R. 15 opens by means of the bits of minor importance and $C_C$ is charged through 15-T3.

6°. $C_C$ is now charged as illustrated in the drawing. The charge current decreases to zero, and 15 closes. $C_C$ maintains its charge.

7°. The S.C.R. 17 opens by means of the bits of minor importance and transmits the negative voltage of $C_C$ to the anode of the S.C.R. 14.

8°. The S.C.R. 18 ceases being conductive, and the S.C.R. 17 takes over its function until $C_C$ is charged, and the charge current has dropped below the holding current for the S.C.R. 17.

9°. The sequence is terminated.

The above trigger circuits in the trigger units are of a conventional design and only serve as power gain and to increase the durability of the pulses.

The above sequence illustrates a manner of arranging the switch-off phase of the first winding symmetrical with the turn-on phase of the second winding. The advantage of this symmetry is, of course, that the effect of the motor can be varied without influencing the operation of the motor.

The ratio of the frequency of the oscillator 1 to the frequency of the mains expresses the fineness obtainable since $$N_1 = \frac{f(VCO)}{4 \times 50} = \frac{f}{200}$$

whereby $N_1$ equals the number of steps within a quarter of a period ($2^N = 4 N_1$).

The turn-on phase of 9 must be adjustable between 0° and 90° and between 180° and 270°. The switch-off phase of 10 must be adjustable between 90° and 180° and between 270° and 360°. The latter is obtained by using the most important bit of TB as an activating function for the trigger circuits.

A data bus comprising four bits provides a resolution of $90°/2^4 = 5.63°$, which is sufficient for many purposes.

C1, C2, R1, R2 in the control means 10 are necessary for the commutation.

The bus FB and thereby the effect of the motor is controlled by means of an analogue-to-digital converter and a variable voltage $U_i$.

The advantage of the above control circuit is that the windings for each phase may be identical.

In an alternative embodiment the two windings per phase are replaced by one winding per phase.

We claim:

1. A control circuit for an A.C. motor with at least two sets of windings, and having a device controlling the power supply to the windings, comprising: a dividing circuit with a counter connected to a source of voltage through a voltage-controlled oscillator and transmitting a bit pattern corresponding to the instantaneous phase of the voltage of said source, the bit pattern corresponding to the maximum counting corresponds to 90°, binary comparator units receiving the bit pattern through a data bus for comparison with both a preselected phase in the form of a bit pattern and a bit pattern corresponding to a phase symmetrical with respect to the maximum value of the voltage, control means and trigger circuit therefor, said second bit pattern being the complement to the preselected bit pattern, each comparator unit at bit pattern identity transmitting a signal for said trigger circuit for said control means, said control means controlling power supply for individual windings, and a switch-off circuit, one of said control means stopping the power supply to a winding before the zero cross-over of the voltage of said source by said switch-off circuit.

2. A control circuit as defined in claim 1 wherein said data bus comprises four bits.

3. A control unit as defined in claim 1 including an analog-to-digital converter for adjusting said data bus.

4. A control circuit as defined in claim 1 wherein said switch-off circuit comprises a transformer, a set of semiconductor rectifiers coupled the windings of said transformer, a capacitor charged by said transformer so that the charge thereof is able to switch off a semiconductor rectifier connected to the capacitor at a predetermined phase before the zero cross-over of the voltage of said source.

* * * * *